US006977689B1

(12) United States Patent
Mace

(10) Patent No.: US 6,977,689 B1
(45) Date of Patent: Dec. 20, 2005

(54) METHOD FOR TIMING DATA PROCESSING AND IMPLEMENTING DEVICE

(75) Inventor: Philippe Mace, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/743,970

(22) PCT Filed: Jul. 16, 1999

(86) PCT No.: PCT/FR99/01736

§ 371 (c)(1),
(2), (4) Date: Jan. 17, 2001

(87) PCT Pub. No.: WO00/04724

PCT Pub. Date: Jan. 27, 2000

(30) Foreign Application Priority Data

Jul. 17, 1998 (FR) .................................. 98 09173

(51) Int. Cl.⁷ .................... H04N 11/00; H04N 7/00
(52) U.S. Cl. ................. 348/465; 348/468; 348/714; 348/718
(58) Field of Search ................. 348/467, 468, 348/465, 473, 589, 600, 714, 718, 564, 569; 375/340, 316, 325, 240.26; 386/1, 45, 95, 386/125, 126; H04N 11/00, 7/00, 9/74

(56) References Cited

U.S. PATENT DOCUMENTS

| 5,574,798 A | * | 11/1996 | Greer et al. ................ 382/100 |
| 5,576,843 A | * | 11/1996 | Cookson et al. .............. 386/97 |
| 5,684,542 A | * | 11/1997 | Tsukagoshi ................ 348/468 |
| 5,847,770 A | * | 12/1998 | Yagasaki .................... 348/563 |
| 5,987,214 A | * | 11/1999 | Iwamura .................... 386/95 |

FOREIGN PATENT DOCUMENTS

EP 765 082 A2 3/1997 .......... H04N 7/088

* cited by examiner

*Primary Examiner*—John Miller
*Assistant Examiner*—Trang U. Tran
(74) *Attorney, Agent, or Firm*—Joseph S. Tripoli; Ronald H. Kurdyla; Joel M. Fogelson

(57) ABSTRACT

The invention relates to a process and a device for time-managing the utilization of data detected in a data flow and constituting a data set.

The device comprises a circuit (MP) for calculating a minimum duration of utilization of the detected data, which is proportional to the amount (L) of data contained in the data set.

The invention applies more particularly to the case in which the detected data are digital data representing subtitles detected in a flow of data conveyed according to the MPEG 2 System transport standard. The utilization of the data then corresponds to the displaying of the subtitles.

18 Claims, 1 Drawing Sheet

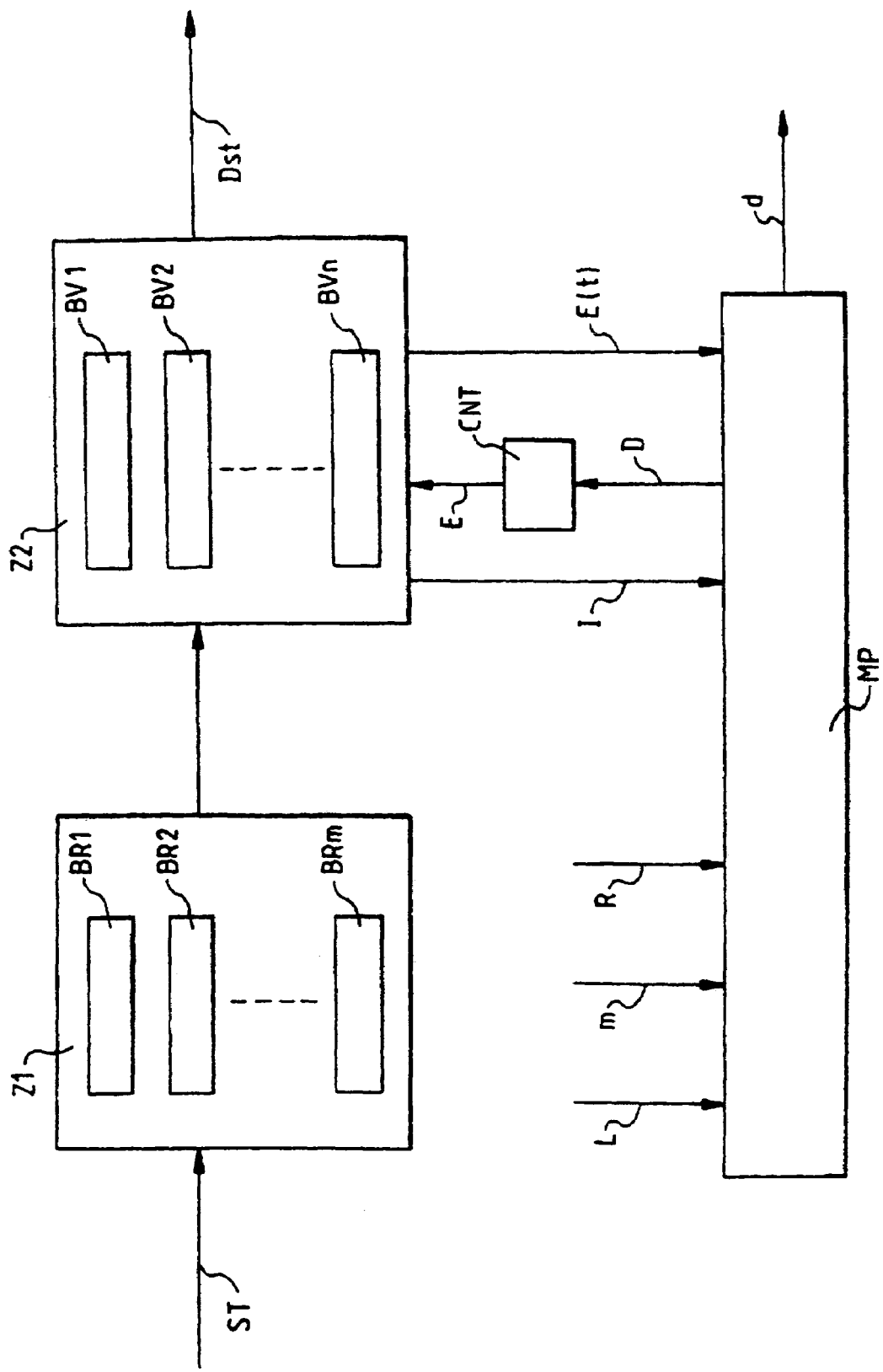

METHOD FOR TIMING DATA PROCESSING AND IMPLEMENTING DEVICE

This application claims the benefit under 35 U.S.C. § 365 of International Application PCT/FR99/01736, filed Jul. 16, 1999, which claims the benefit of French Application No. 98/09173, filed Jul. 17, 1998.

BACKGROUND OF THE INVENTION

1. Field of the Invention

The invention relates to a process for time-managing the utilization of data detected in a data flow as well as to the device implementing the process.

2. Discussion of Background

The invention finds a particularly advantageous application for time-managing the displaying of subtitles obtained from digital data detected in a data flow conveyed in particular but not exclusively according to the MPEG 2 System transport standard.

In most cases, a data flow conveyed according to the MPEG 2 System transport standard comprises a temporal reference signal commonly denoted PCR (the abbreviation PCR standing for "Program Clock Reference"). The reference signal PCR makes it possible to establish a timescale for the data contained in the flow. Moreover, the data flow also contains synchronization signals commonly denoted PTS (the abbreviation PTS standing for "Presentation Time Stamp"). A synchronization signal PTS is a signal making it possible to implement an action on some of the data conveyed by the flow. For the data corresponding to a subtitle, it may, for example, involve the action of displaying the subtitle in synchronism with the appearance of an image. The display PTS signal associated with a subtitle is conveyed in the header of the subtitle. Its value gives the instant at which the subtitle is to be displayed.

The subtitles generally consist of coded data. It is therefore necessary to decode them before displaying them. The expression coded data should be understood, for example, to mean compressed data which need to be decompressed before display.

In the case where, for example, the instant at which a subtitle is to be displayed is very close to the instant at which this subtitle is detected in the flow, the displaying of a subtitle may have drawbacks. The expression "very close in time" should be understood to mean that the duration which separates the instant at which the subtitle is detected is of the same order of magnitude or less than the duration required for the decoding of the data which represent the subtitle. Under these conditions, the duration of display of the subtitle may be very short and, in the extreme case, the subtitle may be lost.

Moreover, in other cases, the data flow conveyed according to the MPEG 2 System standard does not contain any subtitles display PTS signal. These cases correspond, for example, to simultaneous subtitling where it is desired that the subtitles be displayed as soon as possible after having been detected and decoded. In these cases, when a short subtitle follows a long subtitle, the duration of display of the long subtitle may be less than the duration of display of the short subtitle. Thus, the possible duration of display ΔST1 is then equal to:

$\Delta ST1 = \Delta T + DST2 - DST1$, where:

ΔT is the interval of time separating the first subtitle ST1 and the subtitle ST2 which follows the subtitle ST1,
DST1 is the duration of decoding of the subtitle ST1, and
DST2 is the duration of decoding of the subtitle ST2.

For respectively long and short subtitles ST1 and ST2, the durations DST2 and DST1 are respectively short and long. It follows that the duration of display of the long subtitle ST1 is all the shorter as the subtitle ST2 is a short subtitle and the subtitle ST1 is a long subtitle.

SUMMARY OF THE INVENTION

The invention does not have these drawbacks.

Thus, the invention relates to a device for time-managing the utilization of data detected in a data flow and constituting at least one data set, the device comprising a circuit for processing the data detected, a memory for storing the data detected, the data currently being processed, the processed data intended to be utilized and the processed data undergoing utilization, the utilization of the processed data having to be triggered at a given theoretical instant. The device comprises a circuit for calculating a minimum duration d of utilization of the data, which is proportional to the amount of data contained in the data set.

The invention also relates to a process for time-managing the utilization of data detected in a data flow and constituting at least one data set, the process comprising a step of storing the detected data, a step of processing the stored data, a step of storing the data emanating from the processing step and a step of utilizing the stored data emanating from the processing step, the utilization of the processed data having to be triggered at a given theoretical instant. The process comprises a step of calculating a minimum duration d of utilization of the data, which is proportional to the amount of data contained in the data set.

The invention finds a particularly advantageous application in the case where the set of data detected in the data flow represents a subtitle consisting of coded data, which subtitle is to be displayed on screen after decoding the data. The decoding of the data then constitutes the processing of the data and the displaying of the data constitutes the utilization of the data.

Thus, the invention also relates to a device such as that mentioned above according to the invention, characterized in that the detected data set represents a subtitle consisting of coded data detected in a flow of data conveyed according to the MPEG 2 System transport standard, not exclusively, and in that the processing circuit is a circuit for decoding the coded data, the utilization of the data being the displaying of the data on screen.

The invention further relates to a decoder operating according to a compression standard of the MPEG 2 video type, characterized in that it comprises a device such as that mentioned above according to the invention.

Likewise, the invention relates to a process such as that mentioned above, characterized in that the set of data detected in the data flow represents a subtitle consisting of coded data detected in a data flow conveyed according to the MPEG 2 System transport standard, in that the processing of the data is the decoding of the coded data and in that the utilization of the data is the displaying of the data on screen.

The object of the invention is to guarantee a minimum duration d of utilization of a data set, which is proportional to the amount of data which this set contains.

Once calculated, the minimum duration d is applied to a circuit for controlling the duration of utilization so that the duration of utilization of the data may not be less than d.

Within the framework of the particular application of the invention to the displaying of subtitles, the minimum duration of display of the subtitle can be given by the data item D(ST) such that:

$D(ST) = K_{ST} \times L$, L being the length of the subtitle and $K_{ST}$ a positive real number.

The length L can be the cue relating to the length of the subtitle contained in the data flow. The length L can also be equal to the number of full lines of the decoded subtitle expressed in the form of a real number. Other data relating to the subtitle can also be used to calculate the data item D(ST). This may, for example, be a parameter m dependent on the complexity of the language in which the subtitle is to be displayed. In this case, a set of languages contained in a table (not described) are associated with weighting coefficients making it possible to vary the parameter m as a function of the language. The data item D(ST) is then written:

$$D(ST) = K_{ST} \times L \times m.$$

Thus, the invention finds a particularly interesting application in respect of the broadcasting of one and the same program over a territory where various languages are used.

BRIEF DESCRIPTION OF THE DRAWING

According to an improvement of the invention, the minimum duration of utilization of the data is made compatible with constraints of synchronization, durations of processing of the data before utilization and random-access memory available for storing the data.

The attached FIGURE represents a device allowing the implementation of the improvement of the invention. By way of nonlimiting example, this improvement is described within the framework of the particular application of the displaying of subtitles.

DETAILED DESCRIPTION OF THE PREFERRED EMBODIMENT

The device comprises two memory areas Z1 and Z2, a counter CNT and a microprocessor MP.

The memory areas Z1 and Z2 are RAM-type random-access memory areas. The memory area Z1 is divided into several memory spaces BR1, BR2 . . . , BRm which will hereinafter be referred to as reception buffers. Likewise, the memory area Z2 is divided into several memory spaces BV1, BV2, . . . Bvn which will hereinafter be referred to as display buffers. As is known to the person skilled in the art, a display buffer is a memory space capable of allowing the displaying on screen of the data which it contains.

The data which represent the subtitles constitute a signal ST transmitted to the memory area Z1. According to the invention, the data which represent a subtitle are stored in a first reception buffer BR1. If the processing of the data performed in the memory area Z2 has not terminated, then the data which represent the next subtitle are stored in another reception buffer BR2. The subtitles stored in the memory area Z1 are transmitted to the memory area Z2 one after another so that a subtitle transmitted into the area Z2 is always the oldest one stored in the area Z1.

According to the preferred embodiment of the invention, each buffer of the area Z2 is either in a state of decoding the data which it contains, or empty of any data, or in a state awaiting display, or in a state of display. The expression buffer in a "state awaiting display" should be understood to mean that the data contained in the buffer are intended to be read for display. The expression buffer in a "state of display" should be understood to mean that the data contained in the buffer are being read so as to be displayed on screen.

According to another embodiment of the invention, the decoding of the data is not performed in a display buffer of the area Z2 but in a reception buffer of the area Z1. It is then possible for the operation for decoding the data to be performed as and when they are received.

Preferably, the memory area Z2 is divided into 5 display buffers each of which is able to be either in a state of decoding, or empty of data, or in a state awaiting display, or in a state of display. According to the preferred embodiment of the invention, one display buffer is permanently in a state of decoding and another in a state of display. It follows that the other 3 buffers are either empty of data, or in a state awaiting display. Generally, if n is the number of buffers which the area Z2 contains, then n-2 buffers are either empty of data, or awaiting display.

Each time a buffer switches to the awaiting display state, a cue I is transmitted from the memory area Z2 to the microprocessor MP. In return, the microprocessor MP transmits a data item D to the counter CNT which makes it possible to increment the latter by one unit. The counter then transmits a data item E to the memory area Z2 which makes it possible to tag the buffer which has just switched to the awaiting display state. At the moment of display, the buffer in the display state is then identified as being that whose tag signals that it is the oldest.

Generally, the duration d of display calculated by the microprocessor MP at an instant t may be written:

$$d = D(ST) \times X(t), \text{ where}$$

D(ST) is the data item proportional to the subtitle length L, as defined previously, and X(t) an increasing function of the size of an area of the memory Z2 or Z1+Z2 empty of data.

Advantageously, the minimum duration of display of a subtitle can thus be increased when the size of the memory area empty of data increases and decreased when the size of the memory area empty of data decreases.

According to a particular embodiment of the improvement of the invention, the data item X(t) is calculated so as to tend to a data item $X_0$ which may not be exceeded. It is then advantageously possible to avoid an accumulation of the delay in displaying the subtitles.

According to the preferred embodiment of the invention, the data item X(t) is calculated according to an algorithm implementing calculations of the PID type (standing for Proportional/Integral/Differential).

The equation which governs the proportional regime is given by the formula:

$$Xp(t+\Delta t) = Kp \times EM(t+\Delta t), \text{ where}$$

Kp is a positive real number, and

EM(t+Δt) is a data item representing the size of a memory area empty of data at the instant t+Δt, the interval of time Δt being a duration representing the detection of two successive subtitles in the flow. By way of non-limiting example, Δt can be equal to the average duration separating the detection of two successive subtitles, which is calculated on the basis of n previously detected subtitles, n being an integer number, for example equal to 10.

The data item EM(t+Δt) can be equal either to the number N of display or reception buffers which are completely empty of data at the instant t+Δt, or to the number N of display or reception buffers which are completely empty of data at the instant t+Δt, plus, at this same instant, the memory space empty of data of the display or reception buffer in the decoding state.

The equation which governs the integral regime is given by the formula:

$$Xi(t+\Delta t)=Ki \times I(t+\Delta t), \text{ where}$$

$I(t+\Delta t)=I(t)-R$, with $I(t+\Delta t)$ such that $-I1<I(t+\Delta t)<I2$ (I1 and I2 positive) and $R=T_A-T_R$.

The values I1 and I2 are chosen so as to limit the influence of the integral term $Xi(t+\Delta t)$. $T_A$ is the instant at which the displaying of the subtitle actually begins and $T_R$ the theoretical instant at which the subtitle is to be displayed. The quantity R thus represents the algebraically calculated delay between the instant at which the displaying of the subtitle actually begins and the theoretical instant at which the subtitle is to be displayed.

In the case where within the flow there is a PTS signal relating to the displaying of a subtitle, the instant $T_R$ is the value of the PTS. In the case where there is no PTS signal in the flow, the instant $T_R$ is a time reference whose value is such that, for example, the quantity $T_A-T_F$ is equal to y % of the duration of decoding of the subtitle, $T_F$ being the instant at which the subtitle is detected in the flow. By way of nonlimiting example, y can be equal to 120.

The minimum duration d of display of a subtitle grows by the quantity R if R is negative and diminishes by the quantity R if R is positive. The integral term $Xi(t+\Delta t)$ thus allows advantageous management of the successive delays r.

The equation which governs the differential regime is given by the formula:

$$Xd(t+\Delta t)=-Kd \times (EM(t+\Delta t)-EM(t))/\Delta t$$

where Kd is a positive real number.

The contribution of the differential term to the function X(t) advantageously makes it possible to take account of the rate at which the size of the memory area empty of data is changing.

According to the preferred embodiment mentioned above, the duration of display d of a subtitle is calculated according to an algorithm implementing several PID type calculations. It follows that at the instant t+Δt the duration d is proportional to the quantity $Xp,i,d(t+\Delta t)$ such that:

$Xp,i,d(t+\Delta t)=Xp(t+\Delta t)+Xi(t+\Delta t)+Xd(t+\Delta t)$ with $Xmin<Xp,i,d(t+\Delta t)<X_o$, where Xmin is, for example, a duration such that the duration d is substantially equal to 350 ms, below which duration a human eye is no longer aware of the showing of a subtitle on the screen.

The invention also relates to other algorithms for calculating the duration d. These may, among others, be a proportional-type calculation algorithm (only the proportional term such as calculated above is then involved in the expression for X(t+Δt)), or alternatively a proportional/integral-type calculation algorithm (only the proportional and integral terms such as calculated above are then involved in the expression for X(t+Δt)). Generally, as mentioned previously, the algorithm for calculating the minimum duration d of display of a subtitle is an increasing function of a random access data memory area. The calculation algorithm according to the invention can be an algorithm implementing fuzzy logic.

Once calculated, the minimum duration of display of a subtitle d is applied to a circuit (not represented in the figure) which controls the displaying of the subtitles data Dst emanating from the display buffer in the display state. The duration of display of the subtitle is then guaranteed to not be less than d.

Of course, the invention is not limited to the embodiment described.

What is claimed is:

1. A device for time-managing the utilization of data detected in a data flow and constituting at least one data set, the device comprising a circuit for processing the data detected, a memory making it possible to store the data detected, the data currently being processed, the processed data Intended to be utilized and the processed data undergoing utilization, the utilization of the processed data having to be triggered at a given theoretical instant wherein said device comprises a circuit (MP) for calculating a minimum duration (d) of utilization of the data, which is proportional to the amount (L) of data contained in the data set and a function of the difference between the theoretical instant at which the utilization of the data begins and the theoretical instant at which the utilization of the data is to be triggered.

2. The device as claimed in claim 1, wherein the minimum duration (d) Is an increasing function of the size of an area of the memory empty of data.

3. The device as claimed in claim 2, wherein the minimum duration (d) Is proportional, at the Instant t+Δt, to the quantity $Xp(t+\Delta t)$ such that:

$$Xp(t+\Delta t)=K_p \times EM(t+\Delta t) \text{ where}$$

$K_p$ is a positive real number and $EM(t+\Delta t)$ a data item representing the size of the area of the memory empty of data at the instant t+Δt, Δt representing the duration separating the detection of two successive data sets.

4. The device as claimed In claim 3, wherein the minimum duration (d) is proportional, at the instant t+Δt, to the quantity $Xp,i(t+\Delta t)$ such that:

$$Xp,i(t+\Delta t)=Xp(t+\Delta t)+KI \times 1(t+\Delta t), \text{ where}$$

Ki is a positive real number, and $I(t+\Delta t)=I(t)-R$ with $I(t+\Delta t)$ such that $-I1<I(t+\Delta t)<I2$ and $R=T_A-T_R$, $T_A$ being the instant at which the utilization of the data begins and $T_R$ the theoretical Instant at which the utilization of the data is to be triggered.

5. The device as claimed in claim 4, wherein the minimum duration is proportional, at the instant t+Δt, to the quantity $Xp,i,d(t+\Delta t)$ such that:

$$Xp,i,d(t+\Delta t)=Xp,i(t+\Delta t)-Kd \times (EM(t+\Delta t)-EM(t))/\Delta t),$$
where Kd is a positive real number.

6. The device as claimed in claim 1, wherein the area of the memory for storing the processed data intended to be utilized is divided into various memory spaces each containing a data set and wherein said device comprises a counter for tagging the various memory spaces as they are being filled so that the utilized data are those contained in the memory space tagged first.

7. The device as claimed in claim 1, wherein the detected data set represents a subtitle consisting of coded data detected in a flow of data conveyed according to the MPEG 2 System transport standard and wherein the processing circuit is a circuit for decoding the coded data, the utilization of the data being the displaying of the decoded data on screen.

8. A decoder operating as claimed in the MPEG 2 video standard, wherein said decoder comprises the device as claimed in claim 7.

9. The device of claim 1, wherein the given theoretical instant is a same value as specified in a presentation time stamp.

10. The device of claim 1, wherein the given theoretical instant Is a time reference whose value is proportional to a duration It takes to decode said processed data.

11. A method for time-managing the utilization of data detected in a data flow and constituting at least one data set, the process comprising a step of storing the detected data, a step of processing the stored data, a step of storing the data emanating from the processing step and a step of utilizing the stored data emanating from the processing step, the utilization of the processed data having to be triggered at a given theoretical instant ($T_R$), wherein said method it comprises a step of calculating a minimum duration (d) of utilization of the data, which is proportional to the amount of data (L) contained in the data set, and a function of the difference between the theoretical instant at which the utilization of the data begins and the theoretical instant at which the utilization of the data is to be triggered.

12. The method as claimed in claim 11, wherein the minimum duration (d) is an increasing function of the size of a data storage area empty of data.

13. The method as claimed in claim 12, wherein the increasing function is proportional to the quantity $Xp(t+\Delta t)$ such that:

$$Xp(t+\Delta t)=K_p \times EM(t+\Delta t), \text{ where}$$

$K_p$ is a positive real number and $EM(t+\Delta t)$ a data item representing the size of the data storage area empty of data at the instant $t+\Delta t$, $\Delta t$ being a duration representing the detection of two successive subtitles.

14. The method as claimed In claim 13, wherein the Increasing function is proportional, to the quantity $Xp,i(t+\Delta t)$ such that:

$$Xp,i(t+\Delta t)=Xp(t+\Delta t)+Ki \times I(t+\Delta t), \text{ where}$$

Ki is a positive real number, and
$I(t+\Delta t)=I(t)-R$ with $I(t+\Delta t)$ such that $-I1<I(t+\Delta t)<I2$, and
$R=T_A-T_R$, $T_A$ being the instant at which the utilization of the data begins
and $T_R$ the theoretical instant at which the utilization of the data is to be triggered.

15. The method as claimed in claim 14, wherein the increasing function is proportional to the quantity $Xp,i,d(t+\Delta t)$ such that:

$$Xp,I,d(t+\Delta t)=Xp,i(t+\Delta t)-Kd \times (EM(t+\Delta t)-EM(t))/\Delta t,$$
where Kd is a positive real number.

16. The method as claimed in claim 11, wherein said method comprises a step of counting making it possible for the utilized data to be the data emanating from the processing step which has been stored for the longest time.

17. The method as claimed in claim 11, wherein the set of data detected in the data flow represents a subtitle consisting of coded data in a data flow conveyed according to the MPEG 2 System transport standard, wherein the processing of the data is the decoding of the coded data and wherein the utilization of the data is the displaying of the decoded data on screen.

18. The method as claimed In claim 17, wherein the minimum duration (d) of display of the decoded data is proportional to a parameter (m) dependent on weighting means related to the language in which the subtitle Is to be displayed.

* * * * *